(12) United States Patent
Choi

(10) Patent No.: US 9,016,425 B1
(45) Date of Patent: Apr. 28, 2015

(54) PEDESTRIAN AIRBAG SYSTEM FOR VEHICLE

(71) Applicants: Hyundai Motor Company, Seoul (KR); KIA Motors Corp., Seoul (KR)

(72) Inventor: Jae Ho Choi, Whasung-Si (KR)

(73) Assignees: Hyundai Motor Company, Seoul (KR); KIA Motors Corp., Seoul (KR)

( * ) Notice: Subject to any disclaimer, the term of this patent is extended or adjusted under 35 U.S.C. 154(b) by 0 days.

(21) Appl. No.: 14/485,431

(22) Filed: Sep. 12, 2014

(30) Foreign Application Priority Data

Apr. 25, 2014 (KR) .......................... 10-2014-0049824

(51) Int. Cl.
  *B60R 21/36* (2011.01)
  *B60R 21/00* (2006.01)
  *B60R 21/34* (2011.01)

(52) U.S. Cl.
  CPC .......... *B60R 21/36* (2013.01); *B60R 2021/0048* (2013.01); *B60R 2021/346* (2013.01); *B60R 21/34* (2013.01)

(58) Field of Classification Search
  USPC .................................................. 280/274, 271
  IPC ............................................. B60R 21/34,21/36
  See application file for complete search history.

(56) References Cited

U.S. PATENT DOCUMENTS

| | | | | |
|---|---|---|---|---|
| 6,467,563 B1* | 10/2002 | Ryan et al. | ..................... | 180/274 |
| 6,827,170 B2* | 12/2004 | Hamada et al. | ................ | 180/274 |
| 6,923,286 B2* | 8/2005 | Sato et al. | ...................... | 180/274 |
| 7,150,495 B2* | 12/2006 | Fayt et al. | ................ | 296/187.02 |
| 7,341,274 B2* | 3/2008 | Mori et al. | .................. | 280/728.2 |
| 8,016,066 B1* | 9/2011 | Boxey | ............................ | 180/271 |

FOREIGN PATENT DOCUMENTS

| | | |
|---|---|---|
| JP | 2006-240385 A | 9/2006 |
| JP | 2007-153062 A | 6/2007 |
| KR | 10-2008-0081346 A | 9/2008 |

* cited by examiner

*Primary Examiner* — Faye M Fleming
(74) *Attorney, Agent, or Firm* — Morgan, Lewis & Bockius LLP

(57) ABSTRACT

A pedestrian airbag system for a vehicle may include a hood panel having an attachment surface disposed in a lower surface of a rear end portion thereof, an elevated surface which is disposed at a rear side of the attachment surface and is elevated with respect to the attachment surface, and an intermediate surface which is disposed between the attachment surface and the elevated surface, an airbag housing which is attached to a lower surface of a rear end portion of the hood panel, and a tear line which is formed in a rear surface of the airbag housing, the tear line allowing a portion of the airbag housing to form an airbag door, in which an upper end of the tear line is disposed lower than the bolt.

19 Claims, 5 Drawing Sheets rear side ← → front side

PEDESTRIAN AIRBAG SYSTEM FOR VEHICLE

CROSS REFERENCE TO RELATED APPLICATION

The present application claims priority to Korean Patent Application No. 10-2014-0049824, filed Apr. 25, 2014, the entire contents of which is incorporated herein for all purposes by this reference.

BACKGROUND OF THE INVENTION

1. Field of the Invention

The present invention relates to a pedestrian airbag system for a vehicle which is installed within the hood of a vehicle to protect a pedestrian when a vehicle hits a pedestrian.

2. Description of Related Art

The present invention relates to a technology regarding the structure of a cushion of a pedestrian airbag module. A pedestrian airbag is used to effectively protect the head of a pedestrian when a vehicle collides with a pedestrian and when the head of a pedestrian is likely to hit the hood or cowl of a vehicle. A pedestrian airbag works in a manner that a sensor installed in a bumper detects a pedestrian and sends a detection signal, causing an airbag mounted on a lower end of the hood of a vehicle to deploy.

The deployed airbag prevents the head of a pedestrian from directly hitting a rigid area such as a cowl or a front pillar of a vehicle.

The pedestrian airbag needs to be smoothly deployed without any interference and must not be damaged during the deployment process for effective protection of a pedestrian. For this reason, it is required that the rear end of a hood panel does not interfere with the deployment of the pedestrian airbag.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pedestrian airbag system for a vehicle which prevents an airbag cushion from being snagged on a bolt which is disposed in the back of an airbag module (in a direction in which an airbag cushion deploys) and which fixes the airbag module to the vehicle, or on sharp edges of a hood panel.

According to various aspects of the present invention, a pedestrian airbag system for a vehicle may include a hood panel having an attachment surface provided in a lower surface of a rear end portion thereof which is near an end of a windshield glass, an elevated surface which is disposed at a rear side of the attachment surface and is elevated with respect to the attachment surface, and an intermediate surface which is disposed between the attachment surface and the elevated surface in a continuous manner, an airbag housing which is attached to the lower surface of the rear end portion of the hood panel, a front end of which is fixed to the attachment surface, and a rear end of which is fixed to the elevated surface using a bolt, and a tear line which is formed in a rear surface of the airbag housing and takes a form of a temporary cutting line, the tear line allowing a portion of the airbag housing to form an airbag door, in which an upper end of the tear line is disposed to be lower than the bolt.

An upper end of the rear surface of the airbag housing may be higher than an upper end of a front surface of the airbag housing.

The bolt may be fixed to the elevated surface in such a manner that a head of the bolt protrudes from the lower surface of the hood panel.

An upper end of the tear line may be disposed to be lower than a lower end of the head of the bolt.

The airbag door of the airbag housing may be opened in a manner such that the tear line at upper and respective side ends of the airbag door is torn and the airbag door rotates around a lower end of the airbag door.

The pedestrian airbag system for a vehicle may further include an airbag cushion disposed inside the airbag housing.

The pedestrian airbag system for a vehicle may further include a protective cover disposed inside the air bag housing, in which a front end of the protective cover is fixed to the airbag housing, a rear end of the protective cover extends to surround the rear end of the airbag cushion, and the protective cover is unfolded when the airbag cushion deploys, thereby preventing the airbag cushion from coming into direct contact with the bolt.

The protective cover may be installed such that the front end of the protective cover is fixed to an upper surface of the airbag housing, a body of the protective cover extends rearward over an upper end of the airbag cushion, and the rear end of the protective cover surrounds the rear end of the airbag cushion.

The rear end of the airbag housing may be fixed to the hood panel using a plurality of bolts distanced from each other, and there may be a plurality of protective covers which are distanced from each other and disposed in positions corresponding to the bolts.

The protective cover may be wider than the airbag cushion so as to protrude from respective sides of the airbag cushion, thereby preventing the airbag cushion from coming into direct contact with corners of the rear end of the hood panel.

The pedestrian airbag system for a vehicle may further include a flange which is fixed to the rear end of the airbag housing and extends in a width direction of a vehicle, in which the bolt is screwed into the hood panel and penetrates through the flange and the rear end of the airbag housing.

According to the pedestrian airbag system for a vehicle having the structure described above, it is possible to prevent an airbag cushion from being snagged on a bolt which is disposed at the back of an airbag module (in a direction in which the airbag cushion deploys) and fixes the airbag module, or on sharp edges of a hood panel when the hood of a vehicle is popped up open and the airbag cushion deploys.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
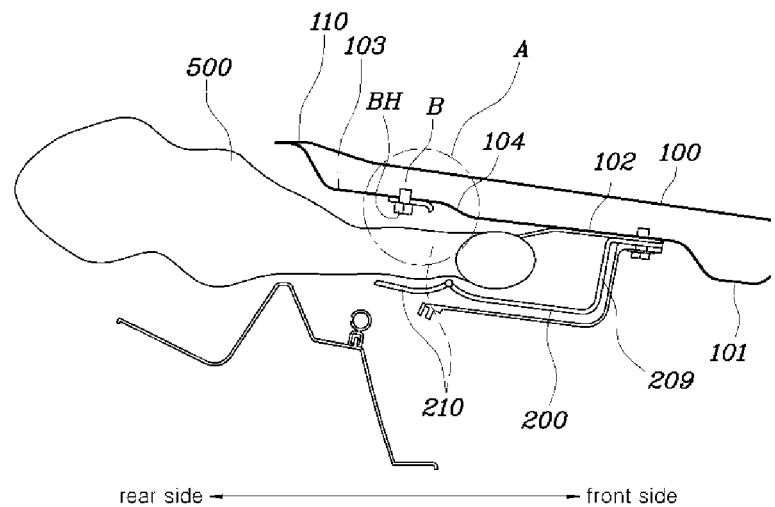
FIG. 1 is a side view of an exemplary pedestrian airbag system for a vehicle according to the present invention.
Figure 2:
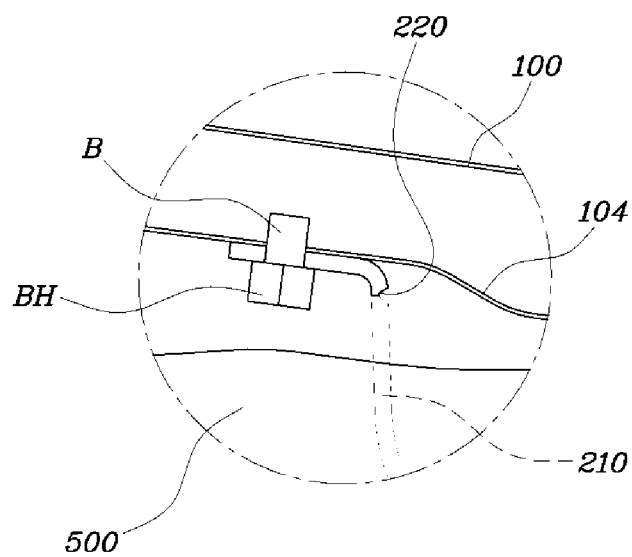
FIG. 2 is an enlarged view of a portion A of FIG. 1.
Figure 3:
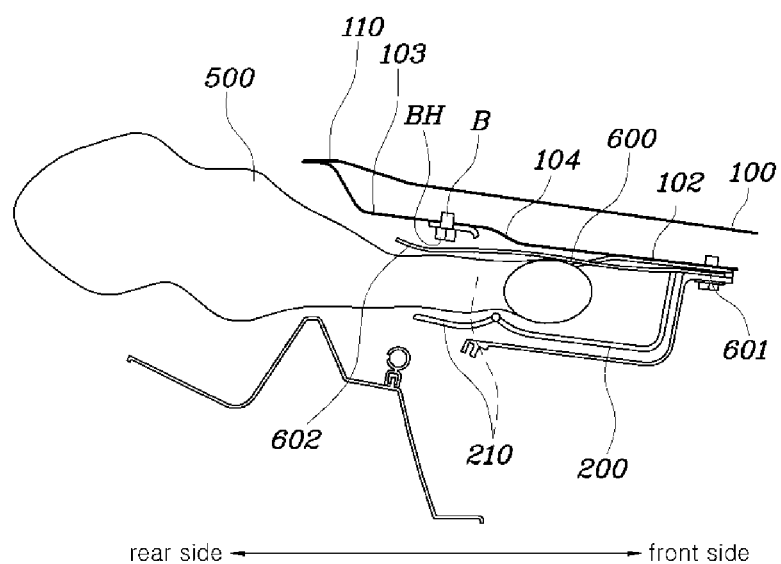
FIG. 3 is a side view of an exemplary pedestrian airbag system for a vehicle according to the present invention.

As illustrated in FIGS. 1 and 2, the pedestrian airbag system for a vehicle according to various embodiments includes hood panel 100, an airbag housing 200, and a tear line 220. The hood panel 100 has an attachment surface 102 which is disposed in a lower surface 101 of a rear end portion thereof which is near an end of a windshield glass, an elevated surface 103 which is disposed at a rear side of the attachment surface 102 and is elevated with respect to the attachment surface 102, and an intermediate surface 104 which is a curved surface and connects the rear end of the attachment surface 102 to a front end of the elevated surface 103. The airbag housing 200 is installed on the lower surface 101 of the rear end portion of the hood panel 100. A front end of the airbag housing 200 is fixed to the attachment surface 102, a rear end of the airbag housing 200 is fixed to the elevated surface 103, and the rear end of the airbag housing 200 is fixed to the elevated surface 103 using a bolt B. The tear line 220 is formed in a rear surface of the airbag housing in the form of a temporary cutting line so that a portion of the airbag housing 200 can serve as an airbag door 210. An upper end of the tear line 220 is disposed to be lower than the bolt B.

That is, in order to prevent an airbag cushion 500 from being snagged on the bolt B which fixes the airbag housing and which is disposed in the back of the airbag module (in the direction in which the airbag cushion 500 deploys, a rear end portion of the hood panel 100 has a stepped structure and the bolt B is disposed to be higher than the tear line 220 of the airbag door 210. This structure enables the airbag cushion to avoid interfering with a head BH of the bolt B which is disposed to be higher than the airbag cushion when the airbag cushion deploys, thereby preventing the airbag cushion 500 from being snagged.

Specifically, when the airbag cushion deploys, the rear end portion of the hood panel 100 is lifted by a lifter and the airbag cushion deploys at the lifted position to be ejected from the hood. In the hood panel 100, the attachment surface 102 is provided in the lower surface 101 of the rear end portion of the hood panel which is near an end of the windshield glass, and the airbag housing 200 is installed under the attachment surface 102. In addition, the elevated surface 103 is disposed at the rear side of the attachment surface 102 and is formed to be higher than the attachment surface 102, and the intermediate surface 104, which is a curved surface, is disposed in a continuous manner between the rear end of the attachment surface 102 and the elevated surface 103.

The airbag housing 200 is fixed to the lower surface 101 of the rear end portion of the hood panel 100. Specifically, the front end of the airbag housing 200 is fixed to the attachment surface 102, and the rear end of the airbag housing 200 is fixed to the elevated surface 103. More specifically, the rear end of the airbag housing 200 is fixed to the elevated surface 103 of the hood panel 100 using the bolt B.

The airbag housing 200 has the tear line 220 in order to form the airbag door 210 which is opened when the airbag cushion 500 deploys. The tear line 220 is disposed in the rear surface of the airbag housing 200 and formed in the form of a temporary cutting line so that a portion of the back surface of the airbag housing 200 serves as the airbag door 210. Specifically, the upper end of the tear line 220 is disposed to be lower than the bolt B so that the airbag cushion 500 will not be snagged on the head BH of the bolt B when the airbag cushion 500 deploys. That is, the tear line 220 is structured to ensure safe operation of the airbag cushion 500. That is, the upper end of the tear line 220 is disposed to be lower than the lower end of the head BH of the bolt.

That is, inflation of the airbag cushion 500 is completely free of interference from the bolt B because the bolt B is disposed to be higher than the airbag cushion by adopting the structure in which the rear end portion of the hood panel 100 has a stepped structure and because the upper end of the tear line 220 is disposed to be lower than the bolt B.

In addition, as illustrated in the drawings, an upper end of the rear surface of the airbag housing 200 may be higher than an upper end of the front surface 209. Because of this structure, even though the upper end of the tear line 220 is formed in a low position, the height of the airbag door 210 can be sufficiently secured. This is attributed to the stepped structure of the rear end portion of the hood panel 100.

The bolt B is fixed to the elevated surface in a posture in which the head BH of the bolt B protrudes from the lower surface of the hood panel 100. This arrangement facilitates assembling between the pedestrian airbag and the hood panel and also prevents the airbag cushion 500 from being snagged on the bolt B. That is, safety and easy assembly are both achieved.

Figure 11:
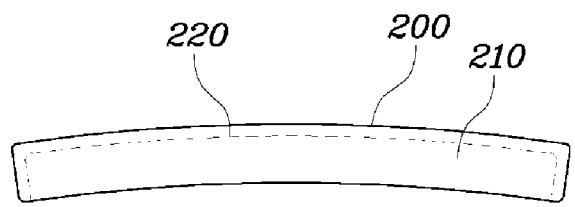
FIG. 11 is a view showing an airbag housing of an exemplary pedestrian airbag system for a vehicle according to the present invention.

Alternatively, as illustrated in FIG. 11, the airbag door 210 of the airbag housing 200 is opened as the tear line 220 at upper and side ends of the airbag door 210 is torn when the airbag starts working, and the airbag door 210 is rotated around a lower end. The tear line 220 takes the form of a temporary cutting line. That is, the tear line 220 may be a shallow groove which is formed in the airbag housing 200 along the contour of the airbag door 210. When the airbag cushion 500 inflates, the tear line 220 is torn and the door 210 becomes open. The tear line 220 is not formed in a position which corresponds to the lower end of the airbag door 210 so that the lower end of the airbag door 210 is not torn and serves as the axis of rotation of the airbag door 210.

Figure 4:
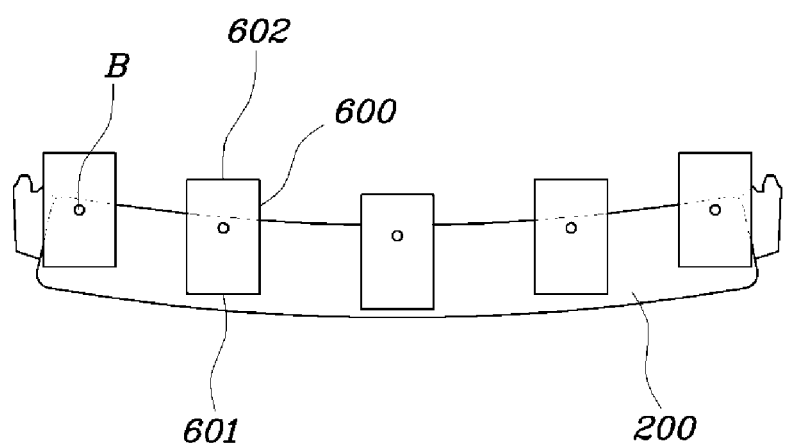
FIGS. 4 and 5 are top plan views of an exemplary pedestrian airbag system for a vehicle according to the present invention.

FIG. 4 illustrates the structure which additionally includes a protective cover 600 compared to the structure described above. The protective cover 600 may be disposed inside the airbag housing 200. A front end 601 of the protective cover 600 is fixed to the airbag housing 200, and a rear end 602 of the protective cover 600 surrounds the rear end portion of the hood panel. In this way, the protective cover 600 is installed to surround the rear end portion of the airbag cushion 500. Because of this structure, when the airbag cushion 500 deploys, the protective cover 600 is unfolded, preventing the airbag cushion 500 from coming into direct contact with the bolt B.

That is, in order to prevent the airbag from being snagged on the bolt B which fixes the airbag housing 200 and is disposed in the back of the pedestrian airbag (in the direction in which the pedestrian airbag deploys), the protective cover 600 covers over the outside surface of the airbag cushion 500 when the airbag cushion 500 is folded and stretches over the head BH of the bolt B when the airbag cushion 500 deploys. That is, the protective cover 600 covers over the bolt B when the airbag cushion 500 deploys, preventing the airbag cushion 500 from being torn or snagged.

The protective cover 600 may be installed such that a front end 601 of the protective cover 600 is fixed to the upper surface of the airbag housing 200, a body of the protective cover 600 stretches rearward and extends over the upper end of the airbag cushion 500, and the rear end 602 of the protective cover 600 surrounds the rear end portion of the airbag cushion 500.

As illustrated in FIG. 4, the rear end of the airbag housing 200 is fixed to the hood panel 100 using a plurality of bolts B which are distanced from each other, and there may be a plurality of protective covers 600 distanced from each other so as to correspond to the bolts B.

Figure 5:
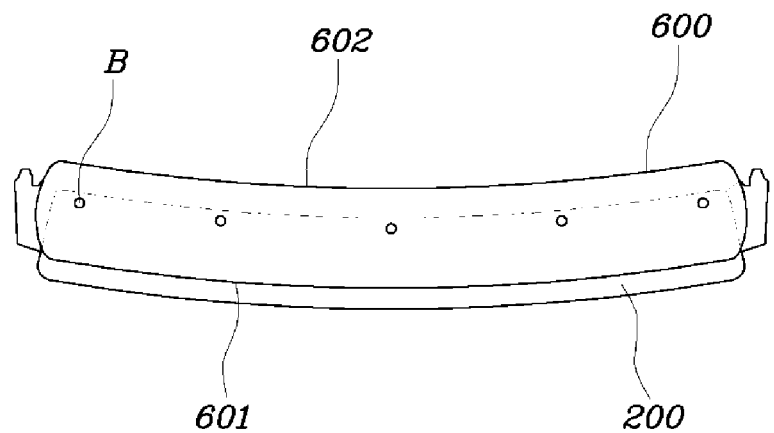

As illustrated in FIG. 5, the protective cover 600 may be made of a piece of fabric to protect the entire surface of the airbag cushion 500. The protective cover 600 may alternatively be made of any other similar material capable of protecting the surface of the airbag cushion 500.

Figure 6:
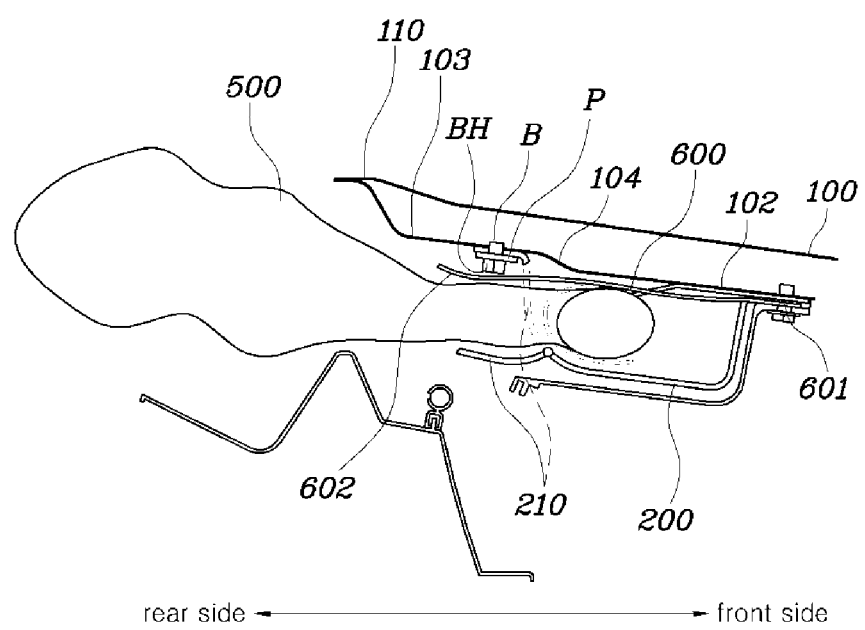
FIG. 6 is a side view of an exemplary pedestrian airbag system for a vehicle according to the present invention.

FIG. 6 illustrates the structure which additionally includes a flange P compared to the structure described above. The flange P which extends in the width direction of a vehicle is fixed to the rear end of the airbag housing 200, and the bolt B is screwed into the hood panel 100 while penetrating through the flange P and the rear end portion of the airbag housing 200.

Figure 7:
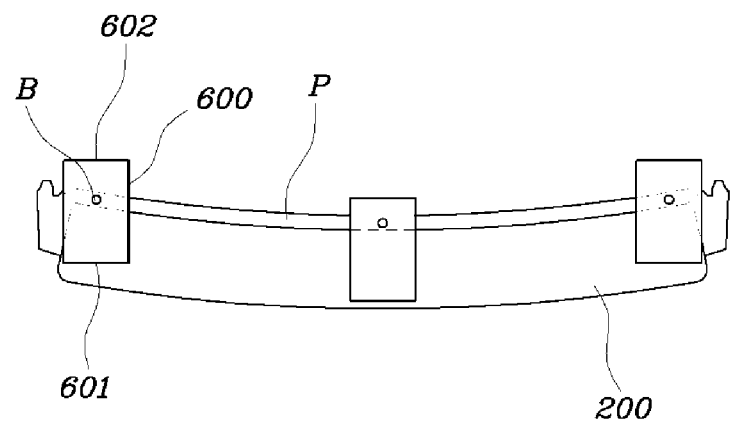
FIG. 7 is a top plan view of an exemplary pedestrian airbag system for a vehicle according to the present invention.

In this case, the flange P and the airbag housing 200 can be simultaneously fixed to the hood panel 100 in a manner that the rear end portion of the airbag housing 200 is first placed to be contact with the hood panel 100, the flange P is then placed under the airbag housing 200, and the bolt B is finally screwed into the hood panel 100. In this case, the number of bolts used is reduced, resulting in a decrease in the number of the protective covers 600 as illustrated in FIG. 7.

Figure 8:
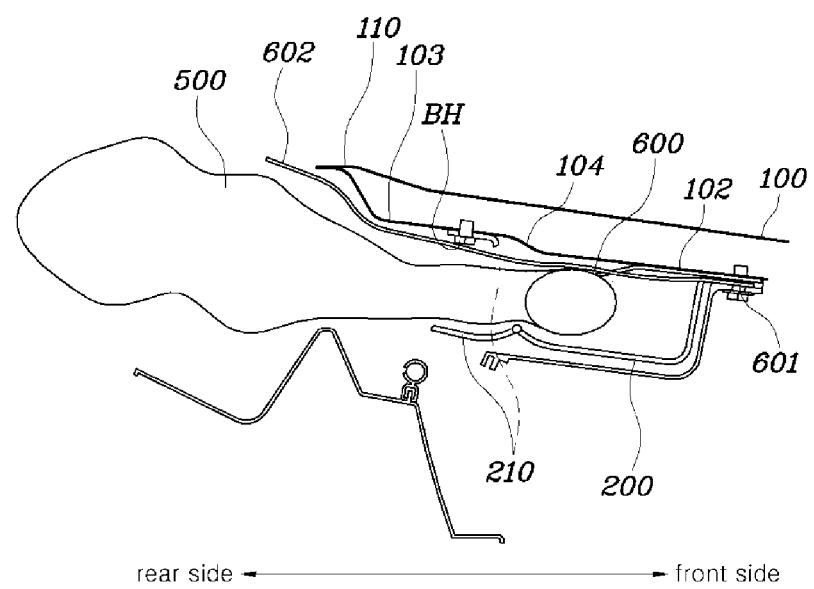
FIG. 8 is a side view of an exemplary pedestrian airbag system for a vehicle according to the present invention.
Figure 9:
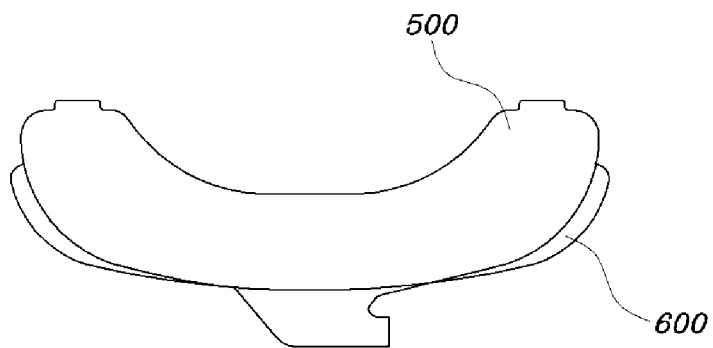
FIG. 9 is a view showing an airbag cushion and a protective cover of an exemplary pedestrian airbag system for a vehicle according to the present invention.

With reference to FIG. 8, the rear end of the protective cover 600 is further extended, and the protective cover 600 is larger in width than the airbag cushion 500. This structure prevents the airbag cushion 500 from coming into direct contact with the corners of the hood panel 100. That is, as illustrated in FIG. 9, since the protective cover 600 has a larger width than the airbag cushion and extends to protrude from respective sides of the airbag cushion 500, the airbag cushion 500 is unlikely to be snagged on the corners of the hood panel when the airbag cushion 500 deploys.

Figure 10:
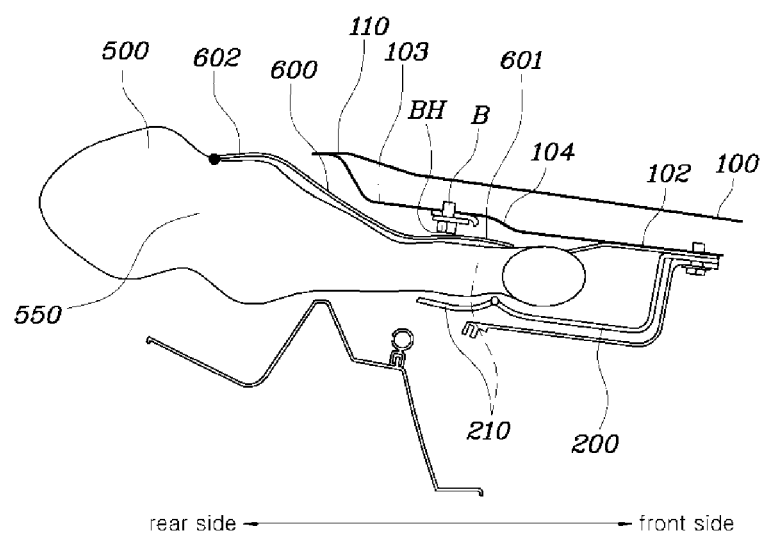
FIG. 10 is a side view of an exemplary pedestrian airbag system for a vehicle according to the present invention.

FIG. 10 illustrates the structure in which the protective cover 600 is unified with the airbag cushion 500. That is, the airbag cushion 500 and the protective cover 600 are sewn together to form a two-ply fabric. In this case, the rear end 602 of the protective cover 600 is sewn onto an upper end of an internal tether 550 which is disposed inside the airbag cushion 500 and controls the thickness of the airbag cushion 500. Accordingly, the protective cover 600 and the airbag cushion 500 are unified into a single body made of two-ply fabric. The airbag cushion 500 and the protective cover 600 may alternatively be unified by any other similar way of joining such as gluing or fusing the two materials together.

According to the pedestrian airbag system for a vehicle having the structure described above, it is possible to prevent the airbag cushion from being snagged on the bolt, which is disposed in the back of an airbag module (in the direction in which the airbag cushion deploys) and which fixes the airbag module; or on sharp edges of the hood panel of a vehicle when the airbag cushion deploys.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedestrian airbag system for a vehicle, comprising:
a hood panel having an attachment surface disposed in a lower surface of a rear end portion of the hood panel near a windshield glass, an elevated surface disposed above a rear side of the attachment surface, and an intermediate surface disposed between the attachment surface and the elevated surface in a continuous manner;
an airbag housing attached to the lower surface of the rear end portion of the hood panel, a front end of the airbag housing being fixed to the attachment surface, and a rear end of airbag housing is fixed to the elevated surface by a bolt; and
a tear line formed in a rear surface of the airbag housing in the form of a temporary cutting line, the tear line defining a portion of the airbag housing as an airbag door, wherein an upper end of the tear line is disposed lower than the bolt, wherein an upper end of the rear surface of the airbag housing is higher than an upper end of a front surface of the airbag housing.

2. The pedestrian airbag system of claim 1, wherein the bolt is fixed to the elevated surface in such a manner that a head of the bolt protrudes from a lower surface of the hood panel.

3. The pedestrian airbag system of claim 2, wherein an upper end of the tear line is disposed lower than a lower end of the head of the bolt.

4. The pedestrian airbag system of claim 1, wherein the airbag door of the airbag housing is opened in a manner that the tear line at upper and respective side ends of the airbag door is torn and the airbag door rotates around a lower end of the airbag door.

5. The pedestrian airbag system of claim 1, further comprising an airbag cushion disposed inside the airbag housing.

6. The pedestrian airbag system of claim 5, further comprising a protective cover disposed inside the air bag housing, wherein a front end of the protective cover is fixed to the airbag housing, a rear end of the protective cover extends to surround a rear end of the airbag cushion, and the protective cover is unfolded when the airbag cushion deploys, thereby preventing the airbag cushion from coming into direct contact with the bolt.

7. The pedestrian airbag system of claim 6, wherein the protective cover is installed such that the front end of the protective cover is fixed to an upper surface of the airbag housing, a body of the protective cover extends rearward over an upper end of the airbag cushion, and the rear end of the protective cover surrounds the rear end of the airbag cushion.

8. The pedestrian airbag system of claim 6, wherein the rear end of the airbag housing is fixed to the hood panel using a plurality of bolts distanced from each other, and a plurality of protective covers which are distanced from each other are disposed in positions corresponding to the bolts.

9. The pedestrian airbag system of claim 6, wherein the protective cover is wider than the airbag cushion to protrude from respective sides of the airbag cushion, thereby preventing the airbag cushion from coming into direct contact with corners of the rear end of the hood panel.

10. The pedestrian airbag system of claim 6, further comprising a flange which is fixed to the rear end of the airbag housing and extends in a width-wise direction of a vehicle, wherein the bolt is screwed into the hood panel and penetrates through the flange and the rear end of the airbag housing.

11. A pedestrian airbag system for a vehicle, comprising:
a hood panel having an attachment surface disposed in a lower surface of a rear end portion of the hood panel near a windshield glass, an elevated surface disposed above a rear side of the attachment surface, and an intermediate surface disposed between the attachment surface and the elevated surface in a continuous manner;
an airbag housing attached to the lower surface of the rear end portion of the hood panel, a front end of the airbag housing being fixed to the attachment surface, and a rear end of airbag housing is fixed to the elevated surface by a bolt;
a tear line formed in a rear surface of the airbag housing in the form of a temporary cutting line, the tear line defining a portion of the airbag housing as an airbag door, wherein an upper end of the tear line is disposed lower than the bolt;
an airbag cushion disposed inside the airbag housing; and
a protective cover disposed inside the air bag housing, wherein a front end of the protective cover is fixed to the airbag housing, a rear end of the protective cover extends to surround a rear end of the airbag cushion, and the protective cover is unfolded when the airbag cushion deploys, thereby preventing the airbag cushion from coming into direct contact with the bolt.

12. The pedestrian airbag system of claim 11, wherein an upper end of the rear surface of the airbag housing is higher than an upper end of a front surface of the airbag housing.

13. The pedestrian airbag system of claim 11, wherein the bolt is fixed to the elevated surface in such a manner that a head of the bolt protrudes from a lower surface of the hood panel.

14. The pedestrian airbag system of claim 13, wherein an upper end of the tear line is disposed lower than a lower end of the head of the bolt.

15. The pedestrian airbag system of claim 11, wherein the airbag door of the airbag housing is opened in a manner that the tear line at upper and respective side ends of the airbag door is torn and the airbag door rotates around a lower end of the airbag door.

16. The pedestrian airbag system of claim 11, wherein the protective cover is installed such that the front end of the protective cover is fixed to an upper surface of the airbag housing, a body of the protective cover extends rearward over an upper end of the airbag cushion, and the rear end of the protective cover surrounds the rear end of the airbag cushion.

17. The pedestrian airbag system of claim 11, wherein the rear end of the airbag housing is fixed to the hood panel using a plurality of bolts distanced from each other, and a plurality of protective covers which are distanced from each other are disposed in positions corresponding to the bolts.

18. The pedestrian airbag system of claim 11, wherein the protective cover is wider than the airbag cushion to protrude from respective sides of the airbag cushion, thereby preventing the airbag cushion from coming into direct contact with corners of the rear end of the hood panel.

19. The pedestrian airbag system of claim 11, further comprising a flange which is fixed to the rear end of the airbag housing and extends in a width-wise direction of a vehicle, wherein the bolt is screwed into the hood panel and penetrates through the flange and the rear end of the airbag housing.

\* \* \* \* \*